(12) United States Patent
Koike (10) Patent No.: US 6,628,463 B2
(45) Date of Patent: Sep. 30, 2003

(54) TAKING LENS (75) Inventor: Kazumi Koike, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 250 days.

(21) Appl. No.: 09/897,884

(22) Filed: Jul. 5, 2001

(65) Prior Publication Data
US 2002/0015238 A1 Feb. 7, 2002

(30) Foreign Application Priority Data

Jul. 6, 2000 (JP) ........................ 2000-205269

(51) Int. Cl.$^7$ ............................. G02B 9/04; G02B 3/02
(52) U.S. Cl. ........................ 359/793; 359/717
(58) Field of Search .................. 359/646, 717, 359/754, 793, 794

(56) References Cited

U.S. PATENT DOCUMENTS 5,812,327 A * 9/1998 Doh ................... 359/793
6,031,670 A * 2/2000 Inoue ................... 359/717
6,104,553 A * 8/2000 Nagahara ............ 359/793
6,335,835 B1 * 1/2002 Koike ................... 359/717
6,449,105 B1 * 9/2002 Dou ..................... 359/793

FOREIGN PATENT DOCUMENTS

| JP | 1-307712 | 12/1989 |
| JP | 5-281465 | 10/1993 |
| JP | 7-333494 | 12/1995 |
| JP | 9-329741 | 12/1997 |

* cited by examiner

Primary Examiner—Georgia Epps
Assistant Examiner—Darryl J. Collins
(74) Attorney, Agent, or Firm—Young & Thompson (57) ABSTRACT

A taking lens comprises a first meniscus lens opposing its convex surface to an object side and a second lens having a positive power. An image side surface of the first lens and an object side surface of the second lens are aspherical. The taking lens satisfies the following condition:

$$0.25 \leq F/F1 \leq 0.39$$

$$-2.5 \leq F/R3 \times fno \leq 1.5$$

wherein F represents a focal length of the taking lens, F1 represents a focal length of the first lens, R3 represents a radius of the curvature of the object side surface of the second lens, and fno represents a f-number of the taking lens at open aperture.

10 Claims, 9 Drawing Sheets

TRANSVERSE ABBERATION

FIG. 3A  SPHERICAL ABERRATION

FIG. 3B  ASTIGMATISM

FIG. 3C  DISTORTION

TRANSVERSE ABBERATION

TRANSVERSE ABBERATION

TRANSVERSE ABBERATION

FIG. 13

TRANSVERSE ABBERATION

TAKING LENS

BACKGROUND OF THE INVENTION

1. Field of the Invention

The present invention relates to a simple taking lens suitable for a low-priced camera, and more particularly to a taking lens that is constituted from two lens groups two lens elements.

2. Description of the Prior Art

In these days, a handy and simple camera such as lens-fitted photo film unit is produced and widely used. It is ready to take photographs at anytime, and, after taking exposures, it is just to be handed in a processing laboratory without taking out an exposed film. There are many types of the lens-fitted photo film units to fulfill users' purposes and needs. It is sold at low-price, so its manufacturing costs should be as low as possible. Therefore, the lens-fitted photo film unit is of a simple construction in which a unit body pre-loaded with an unexposed photo film incorporates a simple photographic mechanism including a taking lens and a shutter mechanism.

The taking lens used for the lens-fitted photo film unit usually comprises one or two lenses, and has a fixed focus. The taking lens is secured in a lens holder in which a stop with a constant aperture is formed, and its focal length is predetermined to focus at any photographic scenes of which distances are different. In a lens-fitted photo film unit for a 35 mm size photo film, it is designed that a half angle of view is to be at 34°, a focal length of a taking lens is to be 32 mm and f-number thereof is to be about 9.5. In another lens-fitted photo film unit for a 24 mm size photo film, it is designed that a half angle of view is to be at 35°, a focal length of a taking lens is to be 24 mm and f-number thereof is to be about 9.5. Recently, in view of compensating aberration, it is mainly used a taking lens of two lens groups two lens elements type that comprises two lens groups in which each group has a single element, and is disclosed in JPA Nos. 9-329741, 7-333494, 5-281465, and 1-307712.

It is well known that the two lens groups two lens elements type comprises a first meniscus lens at an object side and a second lens with positive power at an image side, and each of the first and second lenses has an aspherical surface. The object side of the first lens has an aspherical surface, so it is difficult to keep a good image quality of an image formed outside of an optical axis while compensating aberration. Therefore, with the taking lens, it tends to enlarge the spherical aberration. If the taking lens is improved to make an illuminance of the image field brighter, an image formed on the center of the image surface is defected. To solve this problem, there is proposed with a taking lens comprising a first lens with an aspherical surface formed in its image side surface, instead of its object side surface.

In the suggested taking lens, a stop is disposed between the first and second lenses, whereas a radius of clear aperture on the image side surface of the second lens is too long comparing to the height of an axial bundle on the surface. Therefore, when using the taking lens with a shutter mechanism, so called a kicker shutter mechanism comprising a shutter blade that is kicked by a force of a coiled spring to open and close a shutter opening, and placing the shutter blade on the image side of the taking lens, the shutter opening becomes extremely large. Then, the unevenness of the exposure is occurred because that each swing interval of the shutter blade is different in response to a position of an image plane. If the shutter blade is disposed between the first and second lenses, called as a between lens shutter, then the shutter opening becomes smaller, and the unevenness of the exposure is reduced accordingly. However, the between lens shutter is complicated and increases a number of assembling steps, so suitability for assembling of the film unit is worsened.

SUMMARY OF THE INVENTION

In view of the foregoing problem, an object of the present invention is to provide a taking lens that a lens speed is fast to make an illuminance on an image surface brighter while keeping optical performance and suitability for assembling of a camera.

To achieve the above object, a taking lens of the present invention comprises of a first meniscus lens with its convex surface facing an object side, and a second lens having a positive power, arranged in this order from the object side. An image side surface of the first lens and either surface of the second lens are aspherical. The taking lens of the present invention satisfies following conditions:

$$0.25 \leq F/F1 \leq 0.39 \tag{1}$$

$$-2.5 \leq F/R3 \times fno \leq 1.5 \tag{2}$$

wherein F represents a focal length of the taking lens, F1 represents a focal length of the first lens, R3 represents a radius of curvature of the object side surface of the second lens, and fno represents f-number of the taking lens at open aperture.

In preferred embodiments of the present invention, a stop is disposed behind the second lens, whereas, between the first and second lenses, is provided a flare stop that restricts light paths of off-axial light rays that focused on out of an optical axis at an image plane. The flare stop satisfies a following condition:

$$1.0 \leq E1/H1 \leq 1.3 \tag{3}$$

wherein E1 represents a radius of a clear aperture of the flare stop, and H1 represents a height of an axial bundle from the optical axis on the surface of the flare stop.

Moreover, in the preferred embodiments of the present invention, the stop is placed between the first and second lenses, and a radius of a clear aperture on the image side surface of the second lens is enlarged to assuredly gain much brightness of the margin of the image field. The second lens satisfies a following condition:

$$1.0 \leq E2/H2 \leq 1.3 \tag{4}$$

wherein E2 represent the radius of the clear aperture on the image side surface of the second lens, and H2 represents a height of the axial bundle from the optical axis on the image side surface of the second lens.

In case of disposing the stop on the image side surface of the second lens, the longer an inner diameter of the flare stop provided between the first and second lenses, the more amount of light on the margin of the image field can be kept. However, above the upper limit of the condition (3), there is too much amount of light rays passing through lower side the optical axis at a position of the stop among the light rays directing toward a position of 25 percent of the height from the optical axis at the image surface, and then the flare in a picture frame increases.

Similarly, above the upper limit of the condition (4), the flare in the picture frame increases, so the entire photographic image is extremely defected. Moreover, the light rays traveling from the second lens to the image surface are widely spread so that the shutter opening should be large enough to allow the passing light rays when disposing the kicker shutter mechanism on the image side surface of the second lens. Then, the unevenness of the exposure is likely to occur.

Moreover, because of the above construction, the illuminance of the image surface becomes brighter. Therefore, it is possible to control exposure by inserting a smaller stop between the first and second lenses aside from a stop aperture even when using the taking lens with a shutter mechanism having a constant shutter speed.

According to the present invention, the first lens has not an aspherical surface on its object side, so it is possible to restrain enlarging a spherical aberration and to obtain a good image on entire image surface. In addition, by arranging the focal length of the first lens and a relationship between the radius of curvature of the object side surface of the second lens and the f-number of the taking lens of the film unit, it is possible to provide the taking lens having a brighter illuminance without unbalancing aberrations.

Furthermore, between the image side surface of the first lens and the image side surface of the second lens, a height of the off-axial rays becomes lower than the height of light rays from the optical axis, so the light rays through the lenses are not affected as far as the stop is positioned therebetween. Therefore, in the taking lens of the present invention, even if the stop is positioned either on the image side surface of the second lens or between the first and second lenses, no changes happen to the lens quality and the illuminance of the image field. It is possible to design the lenses without considering their positional relationship with the stop. Moreover, the image side surface of the second lens is limited to have the minimum clear aperture, so even when the kicker shutter mechanism is disposed thereupon, the shutter opening does not become large to the degree in which the unevenness of the exposure occur. Thus, it is possible to obtain a good image.

BRIEF DESCRIPTION OF THE DRAWINGS

The above objects and advantages of the present invention will become more apparent from the following detailed description when read in connection with the accompanying drawings in which.

DETAILED DESCRIPTION OF THE PREFERRED EMBODIMENTS

Embodiment 1

Figure 1:
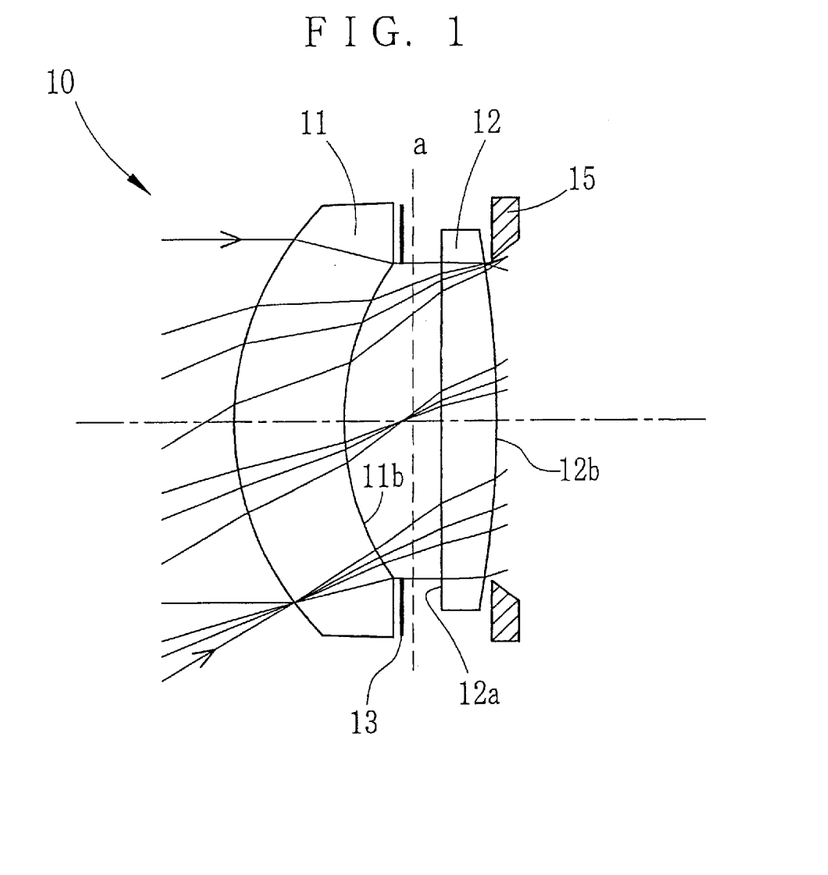
FIG. 1 is a schematic diagram showing a taking lens according to Embodiment 1 of the present invention.
Figure 2:
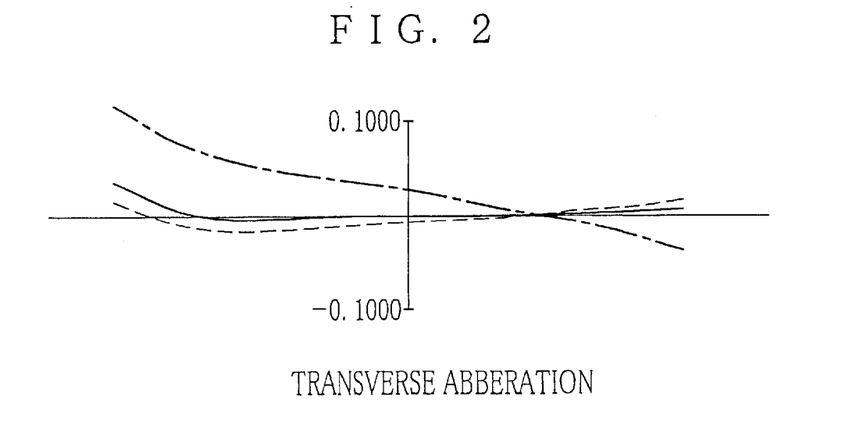
FIG. 2 is a diagram showing a transverse aberration curve of the taking lens according to Embodiment 1.
Figures 3A, 3B:
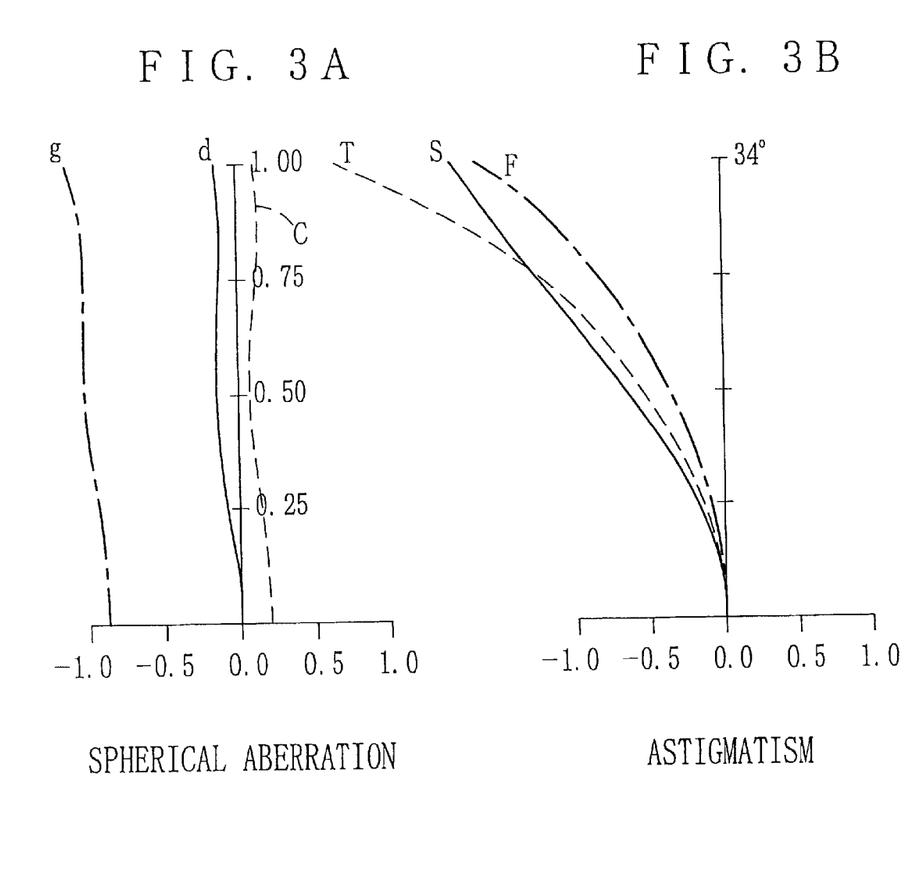
FIGS. 3A, 3B and 3C are diagrams showing aberration curves of the taking lens according to Embodiment 1.
Figure 3C:
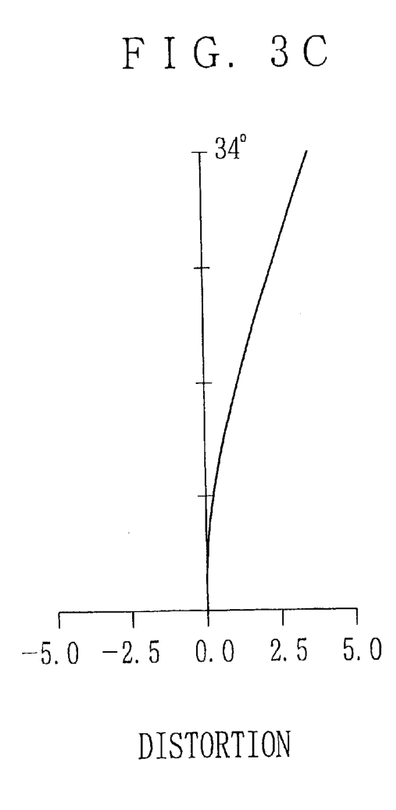

A taking lens 10, as shown in FIG. 1, comprises a first meniscus lens 11 having a convex surface facing an object side and a second lens 12 having a positive power, arranged in this order from the object side. Between the first and second lenses 11 and 12, a flare stop 13 is positioned to prevent occurrence of flare by restricting light paths on which off-axial light rays traveling. Moreover, on the image side surface 12b of the second lens 12, a stop aperture 15 is positioned. The image side surface 11b of the first lens 11 and either surface 12a and 12b of the second lens 12 are aspherical. Note that a position as shown in a dotted line in FIG. 1, represents a position for inserting a smaller stop that controls light amount for exposure when the taking lens 10 is used with a shutter mechanism having a constant speed.

In the first embodiment, the image side surfaces 11b and 12b of the first and second lenses 11 and 12 are aspherical. The radiuses of the clear apertures of the flare stop 13 and the image side surface 12b of the second lens 12 are constructed to be equal to the height of an axial light bundle. The photo film positioned at an image surface is curved to a radius of curvature R (−100) along its longitudinal direction.

Numerical values of the first embodiment are as set forth below.

F=33.15 mm

F1=107.13 mm f1=6.43 f2=10.00

ω/2=34° wherein f1 represents an f-number at open aperture, f2 represents an f-number when a small stop 14 is inserted, and ω/2 represents a half angle of view.

When f1 and f2 are 6.43 and 10.00, their peak values of the spatial frequency curve in 20 lines/mm respectively position at distances from the paraxial focal point with the d-line (587.56 nm). The distances are as follows:

f6.43; −0.1 mm f10; −0.12 mm

Table 1 shows the lens data of the taking lens 10.

In the following tables, i represents the surface serial number of the respective surfaces of the first and second lenses 11 and 12 in the order from the object side, R represents the radius of curvature of the respective surface, D represents the distance between two adjacent surfaces, i.e. the thickness of the lenses or the air space between the two lenses 11 and 12 in the unit of millimeter, and N represents the index of refraction. The film surface positioned an image surface has a concave shape in a longitudinal direction, viewed from the object side, but the image surface is not exactly spherical. Therefore, in the following embodiments, the radius of curvature of the image surface indicates a curvature of the image surface relative to the diagonal direction. An asterisk * is allocated to aspherical surfaces.

TABLE 1

| i | R | D | Radius of clear aperture | Height of the axial bundle | N | Dispersion |
|---|---|---|---|---|---|---|
| 1 | 4.290 | 1.60 | 2.58 | 5.57 | 1.492 | 57.5 |
| 2 | 4.106* | 0.82 | 2.24 | 2.24 | | |
| Flare stop | ∞ | 0.17 | 2.24 | 2.24 | | |
| Smaller stop | ∞ | 0.41 | | | | |
| 3 | ∞ | 0.79 | 2.24 | 2.24 | 1.492 | 57.5 |
| 4 | −20.294* | 0.15 | 2.24 | 2.24 | | |
| Stop aperture | ∞ | 28.334 | 2.21 | 2.21 | | |
| Image surface | −149.330 | −0.25 | | | | |

The aspherical surfaces satisfy the following definition:

$$Z = ch^2/[1+\sqrt{1-(1+K)c^2h^2}] + Ah^4 + Bh^6 + Ch^8 + Dh^{10}$$

wherein Z represents a displacement from the surface peak, c is the inverted number of the radius of curvature (c=1/R), and h is the height from the optical axis. In the following embodiments, all aspherical surfaces satisfy the above definition. Table 2 shows aspherical coefficients K, A, B, C and D of the surfaces 11b (i=2) and 12b (i=4) of the first embodiment.

TABLE 2

| | i = 2 | i = 4 |
|---|---|---|
| K | 0.558419 | 0.000000 |
| A | −0.111893E−04 | −0.595526E−03 |
| B | 0.000000E+00 | 0.164995E−04 |
| C | 0.000000E+00 | −0.961223E−05 |
| D | 0.000000E+00 | 0.000000E+00 |

According to the first embodiment, the characteristic values of the present invention "F/F1" and "F/R3×f1" are:

$F/F1 = 33.15/107.13 \approx 0.31$ $F/R3 \times f1 = 33.15/0 \times 6.43 = 0$

Therefore, the first embodiment satisfies conditions (1) and (2):

$$0.25 \leq F/F1 \leq 0.39 \qquad (1)$$

$$-2.5 \leq F/R3 \times f1 \leq 1.5 \qquad (2)$$

As shown in Table 1, the radius E1 of clear aperture of the flare stop 13 and the height of the axial bundle from the optical axis at the position of the flare stop 13 are:

E1=2.24 mm

H1=2.24 mm

Moreover, the radius E2 of clear aperture on the image side surface 12b of the second lens 12 and the height of the axial bundle from the optical axis H2 on the surface 12b are:

E2=2.24 mm

H2=2.24 mm

Therefore, the characteristic values of the invention "E1/H1" and "E2/H2" are:

E1/H1=1.0

E2/H2=1.0

So the first embodiment satisfies the conditions (3) and (4):

$$1.0 \leq E1/H1 \leq 1.3 \qquad (3)$$

$$1.0 \leq E2/H2 \leq 1.3 \qquad (4)$$

Aberration curves of the taking lens 10 of the first embodiment are shown in FIGS. 2 and 3A to 3C respectively.

In the drawings, the curves d, g and C represent spherical aberrations relative to the d-line (587.6 nm), the g-line (435.8 nm) and the C-line (656.3 nm). The curves S and T represent astigmatisms in the sagittal image surface and the tangential image surface respectively. The curve F represents astigmatism in the film surface formed spherically to a radius of curvature R. Moreover, each of the aberrations is calculated in all embodiments in which the position of the flare stop 13 is considered the position of the stop, and the light passing through the center of the flare stop 13 is considered as a chief ray.

Embodiment 2

Figure 4:
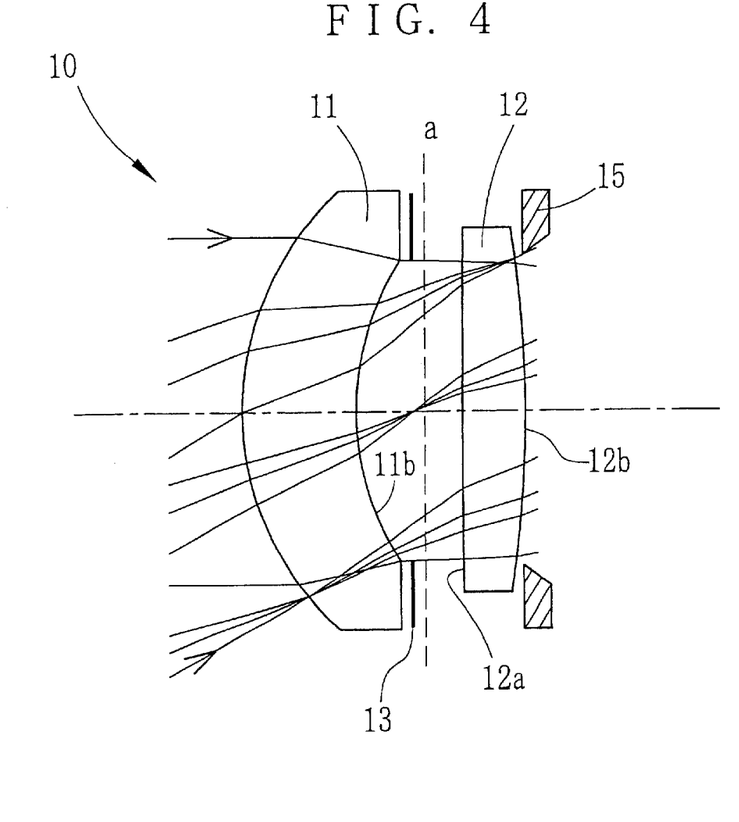
FIG. 4 is a schematic diagram showing a taking lens according to Embodiment 2 of the present invention.
Figure 5:
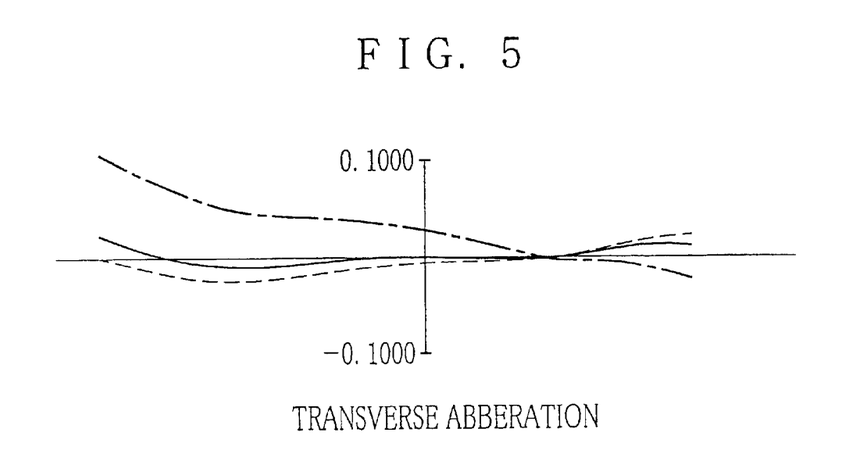
FIG. 5 is a diagram showing a transverse aberration curve of the taking lens according to Embodiment 2.
Figure 6A:
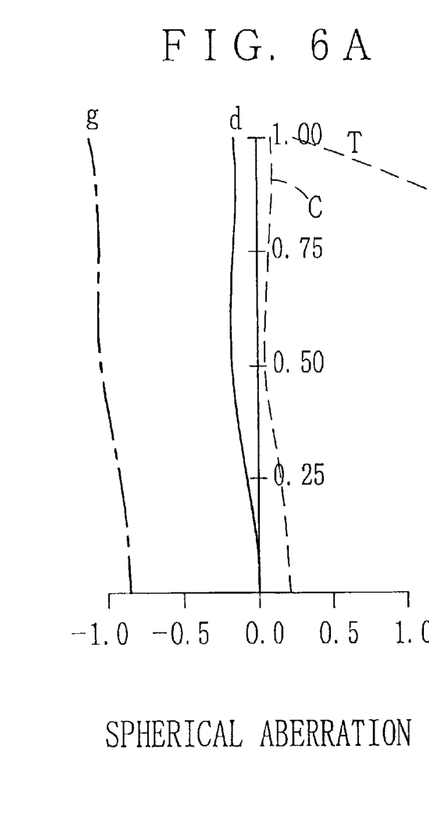
FIGS. 6A, 6B and 6C are diagrams showing aberration curves of the taking lens according to Embodiment 2.
Figure 6B:
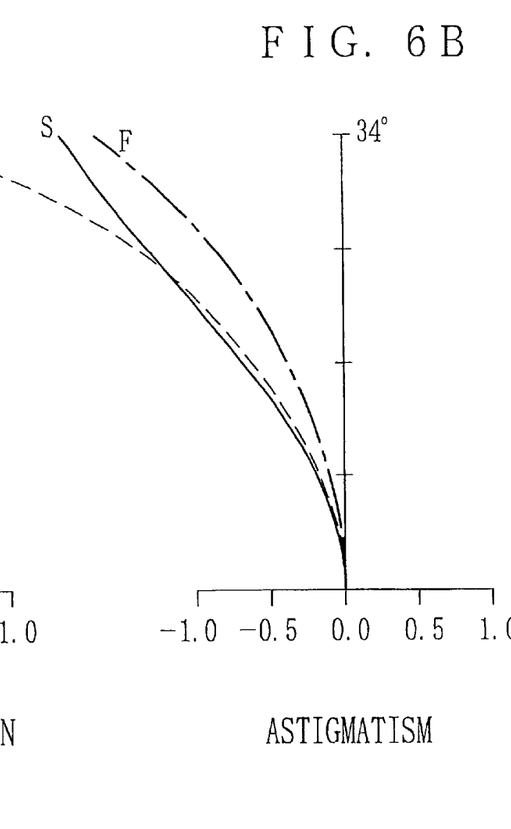
Figure 6C:
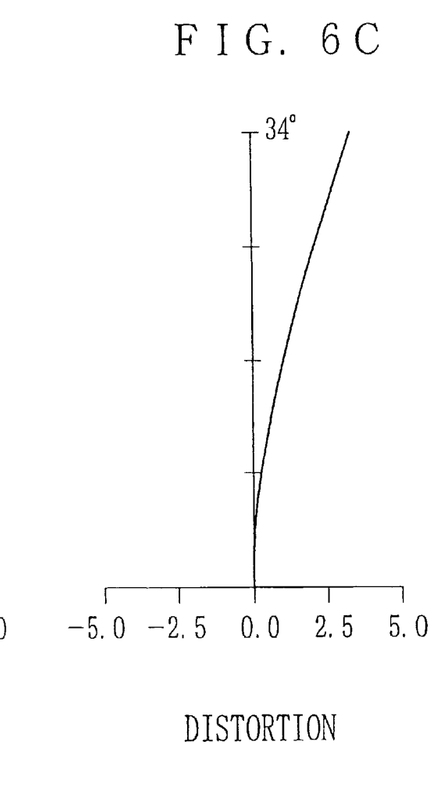

FIG. 4 shows the lens composition of the second embodiment of the present invention. Note that in the following embodiments, portions the same as the first embodiment are shown by the same reference numbers in FIG. 1. In the taking lens 10 of the second embodiment, the image side surface 11b and 12b of the first and second lenses 11 and 12 are aspherical like the first embodiment. In the second embodiment, it is to gain brighter margin of the image field that the flare stop 13 has a larger inner diameter. The photo film is also curved to a radius of curvature R (−100) along its longitudinal direction.

Numerical values for the second embodiment are as set forth below.

F=33.15 mm

F1=95.267 mm f1=6.43 f2=10.0

ω/2=34°

When f1 and f2 are 6.43 and 10.00, their peak values of the spatial frequency curve in 20 lines/mm respectively position at distances from the paraxial focal point with the d-line (587.56 nm). The distances are as follows:

f6.43; −0.133 mm f10; −0.143 mm

The lens data and the aspherical coefficients of the taking lens of the second embodiment are shown in the following Tables 3 and 4.

TABLE 3

| i | R | D | Radius of clear aperture | Height of the axial bundle | N | Dispersion |
|---|---|---|---|---|---|---|
| 1 | 4.429 | 1.70 | 2.85 | 2.58 | 1.492 | 57.5 |
| 2 | 4.273* | 0.82 | | | | |
| Flare stop | ∞ | 0.17 | 2.25 | 2.23 | | |

TABLE 3-continued

| i | R | D | Radius of clear aperture | Height of the axial bundle | N | Dispersion |
|---|---|---|---|---|---|---|
| Smaller stop | ∞ | 0.60 | | | | |
| 3 | 200.00 | 0.90 | | | 2.22 1.492 | 57.5 |
| 4 | −23.789* | 0.15 | 2.21 | 2.21 | | |
| Stop aperture | ∞ | 28.0 | 2.19 | 2.19 | | |
| Image surface | −149.330 | −0.274 | | | | |

TABLE 4

| | i = 2 | i = 4 |
|---|---|---|
| K | 0.569585 | 0.000000 |
| A | 0.308279E−04 | −0.558545E−03 |
| B | −0.251255E−04 | 0.515257E−04 |
| C | 0.000000E+00 | −0.866010E−05 |
| D | 0.000000E+00 | 0.000000E+00 |

According to the second embodiment, the characteristic values of the present invention "F/F1" and "F/R3×f1" are:

$F/F1 = 33.15/95.267 \approx 0.35$ $F/R3 \times f1 = 33.15/200 \times 6.43 \approx 1.07$ Therefore, the second embodiment satisfies conditions (1) and (2).
As shown in Table 3, the characteristic values of "E1/H1" and "E2/H2" are:

$E1/H1 = 2.25/2.23 \approx 1.01$ $E2/H2 = 2.21/2.21 = 1.0$

Therefore, the second embodiment satisfies the conditions (3) and (4).

Aberration curves of the taking lens 10 of the second embodiment are shown in FIGS. 5 and 6A to 6C respectively.

Embodiment 3

Figure 7:
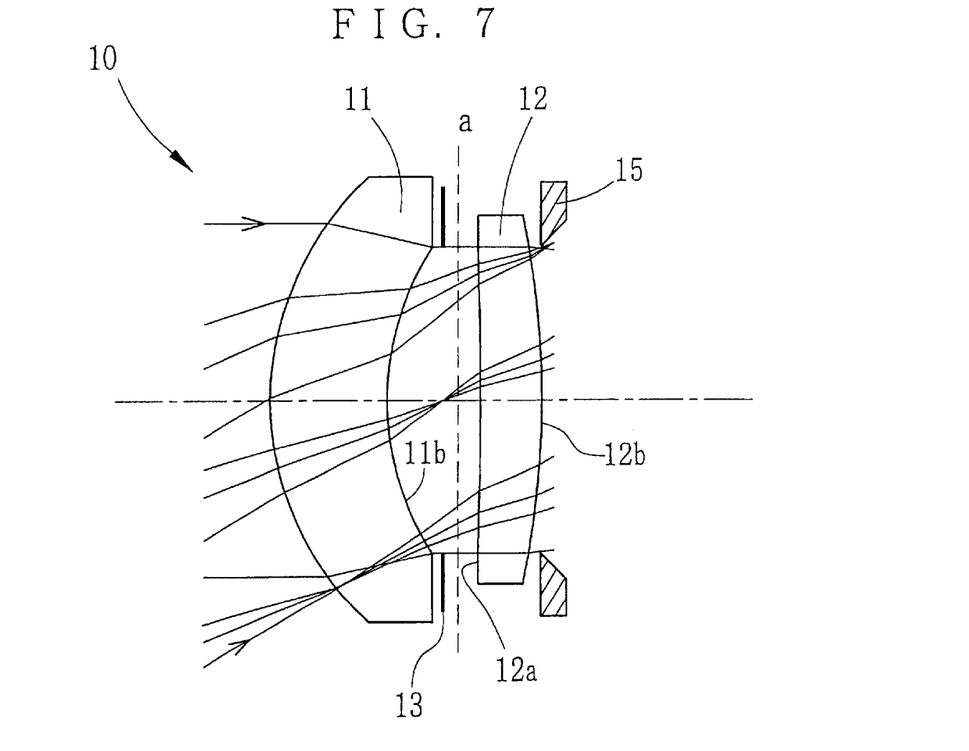
FIG. 7 is a schematic diagram showing a taking lens according to Embodiment 3 of the present invention.
Figure 8:
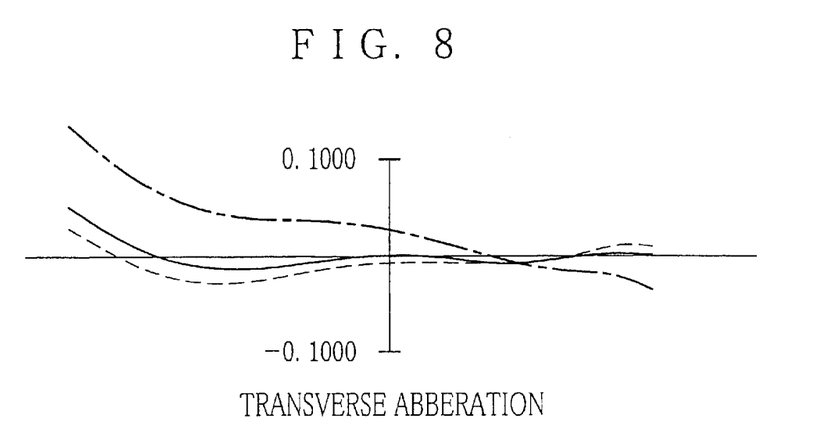
FIG. 8 is a diagram showing a transverse aberration curve of the taking lens according to Embodiment 3.
Figure 9A:
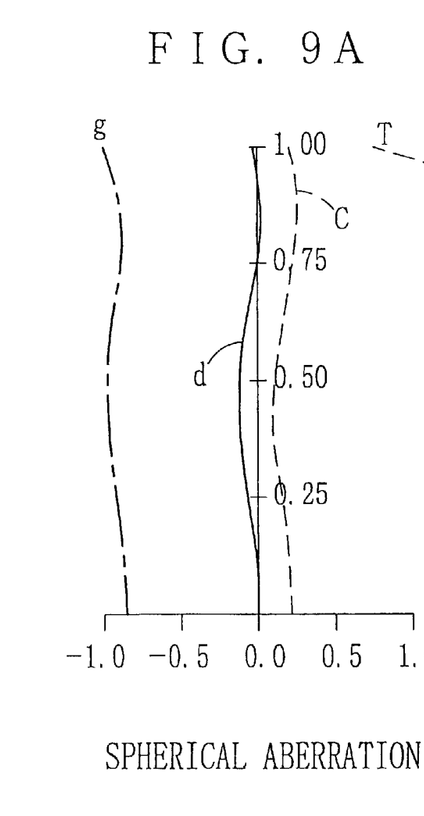
FIGS. 9A, 9B and 9C are diagrams showing aberration curves of the taking lens according to Embodiment 3.
Figure 9B:
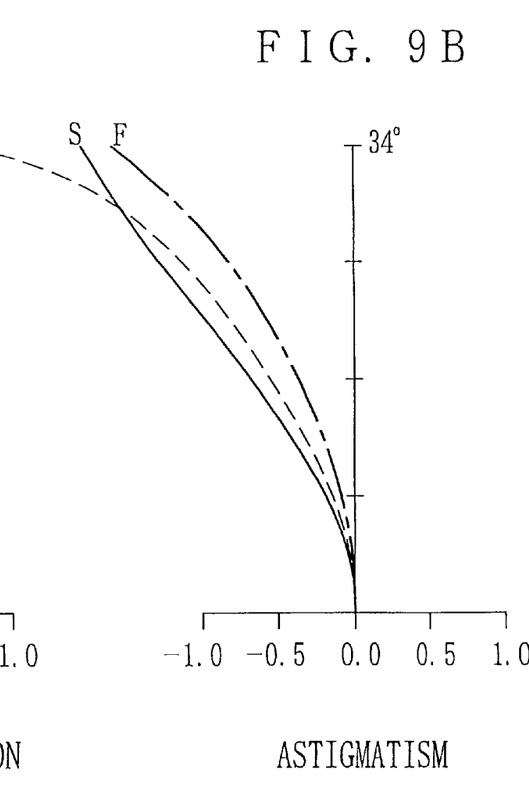
Figure 9C:
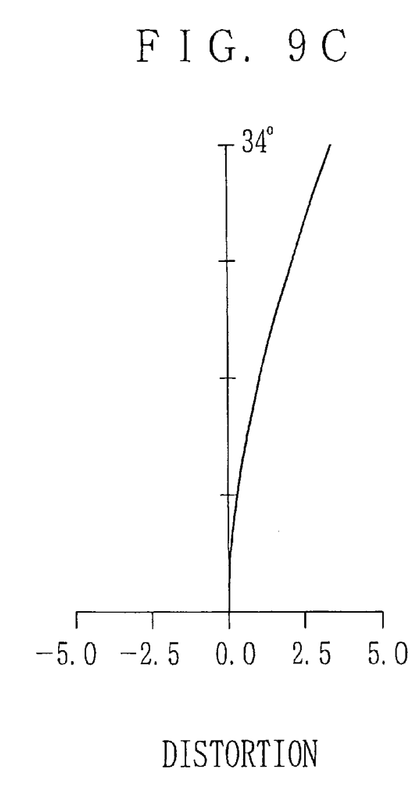

FIG. 7 shows the lens composition of the third embodiment of the present invention. In the taking lens 10 of the third embodiment, the image side surface 11b and 12b of the first and second lenses 11 and 12 are aspherical as well. In the third embodiment, the image side surface 12b of the second lens 12 has longer clear aperture to gain more amount of light on margin of the image field. The photo film is also curved to a radius of curvature R (−100) along its longitudinal direction.

Numerical values for the third embodiment are as set forth below.

F=33.15 mm
F1=102.02 mm
f1=6.43
f2=10.0
ω/2=34°

When f1 and f2 are 6.43 and 10.00, their peak values of the spatial frequency curve in 20 lines/mm respectively position at distances from the paraxial focal point with the d-line (587.56 nm) The distances are as follows:

f6.43; −0.019 mm
f10; −0.089 mm

The lens data and the aspherical coefficients of the taking lens of the third embodiment are shown in the following Tables 5 and 6.

TABLE 5

| i | R | D | Radius of clear aperture | Height of the axial bundle | N | Dispersion |
|---|---|---|---|---|---|---|
| 1 | 4.513 | 1.70 | 2.77 | 2.58 | 1.492 | 57.5 |
| 2 | 4343* | 0.82 | | | | |
| Flare stop | ∞ | 0.17 | 2.24 | 2.24 | | |
| Smaller stop | ∞ | 0.41 | | | | |
| 3 | −100.900 | 0.90 | | | 1.492 | 57.5 |
| 4 | −17.197* | 0.15 | 2.26 | 2.24 | | |
| Stop aperture | ∞ | 28.316 | 2.35 | 2.22 | | |
| Image surface | −149.330 | −0.159 | | | | |

TABLE 6

| | i = 2 | i = 4 |
|---|---|---|
| K | 0.569585 | 0.000000 |
| A | 0.308279E−04 | −0.558545E−03 |
| B | −0.251255E−04 | 0.515257E−04 |
| C | 0.000000E+00 | −0.866010E−05 |
| D | 0.000000E+00 | 0.000000E+00 |

According to the third embodiment, the characteristic values of the present invention "F/F1" and "F/R3×f1" are:

$F/F1 = 33.15/102.02 \approx 0.32$ $F/R3 \times f1 = 33.15/(-100.9) \times 6.43 \approx -2.11$ Therefore, the third embodiment satisfies conditions (1) and (2). As shown in Table 5, the characteristic values of "E1/H1" and "E2/H2" are:

$E1/H1 = 2.24/2.24 = 1.0$ $E2/H2 = 2.26/2.24 \approx 1.01$

Therefore, the third embodiment satisfies the conditions (3) and (4).

Aberration curves of the taking lens 10 of the third embodiment are shown in FIGS. 8 and 9A to 9C respectively.

Embodiment 4

Figure 10:
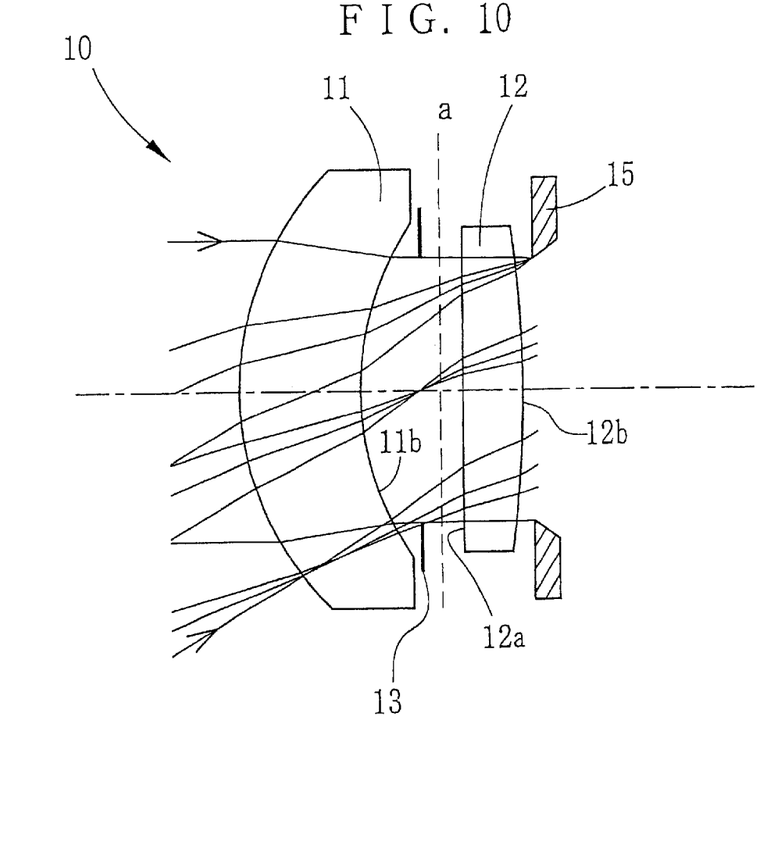
FIG. 10 is a schematic diagram showing a taking lens according to Embodiment 4 of the present invention.
Figure 11:
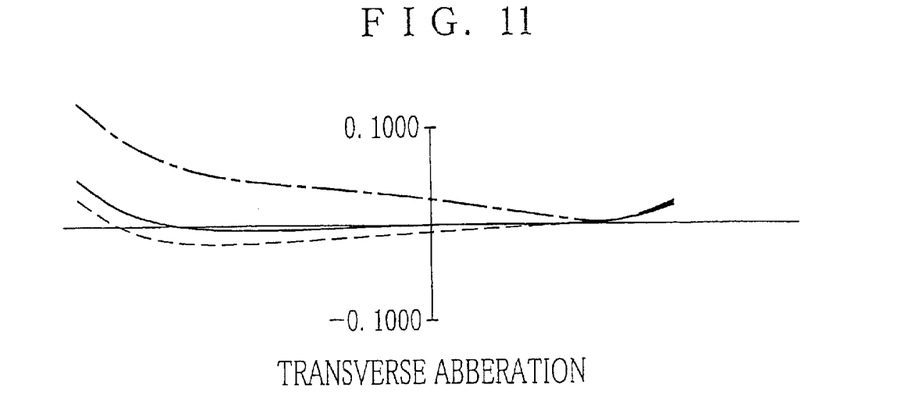
FIG. 11 is a diagram showing a transverse aberration of the taking lens according to Embodiment 4.
Figures 12A, 12B:
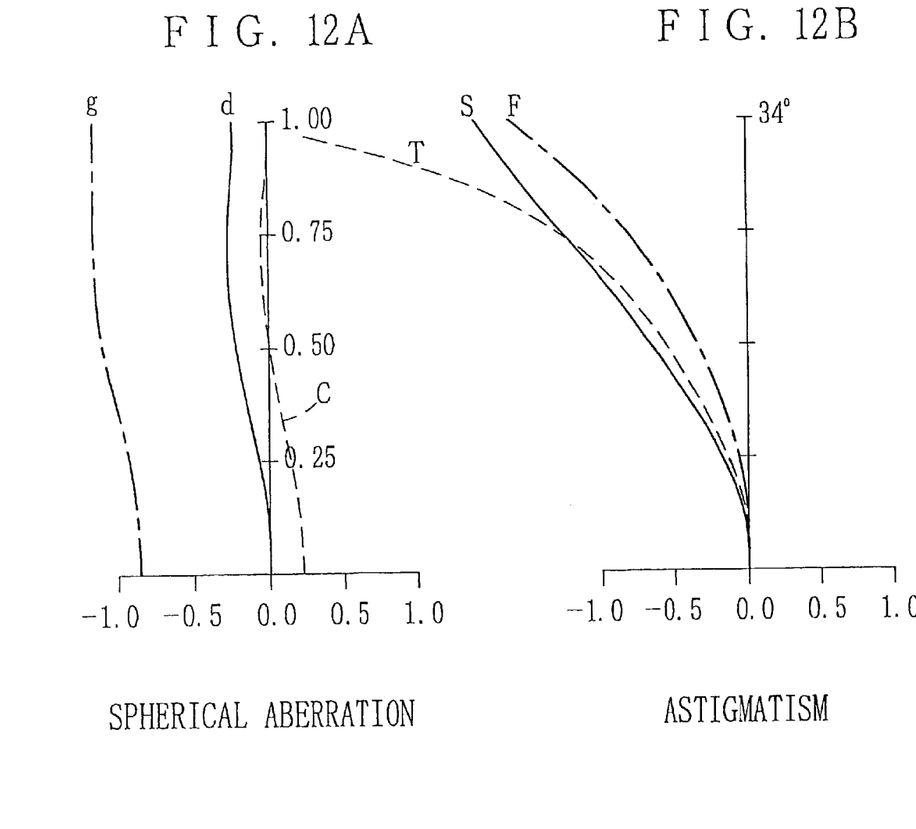
FIGS. 12A, 12B and 12C are diagrams showing aberration curves of the taking lens according to Embodiment 4.
Figure 12C:
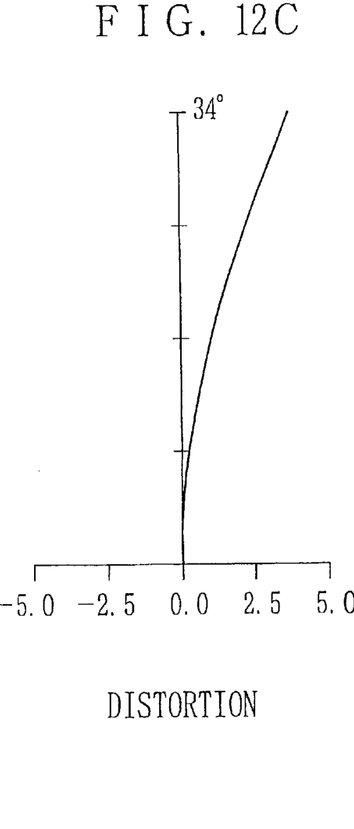

FIG. 10 shows the lens composition of the fourth embodiment of the present invention. In the taking lens 10 of the fourth embodiment, the image side surface 11b and 12b of the first and second lenses 11 and 12 are aspherical as well. In the fourth embodiment, similar to the first embodiment, the radiuses of the clear apertures of the flare stop 13 and the image side surface 12b of the second lens 12 are designed to be equal to the height of the axial bundle. The photo film is also curved to a radius of curvature R (−100) along its longitudinal direction.

Numerical values for the fourth embodiment are as set forth below.

F=33.14 mm

F1=104.37 mm f1=8.0 f2=14.0

ω/2=34°

When f1 and f2 are 6.43 and 10.00, their peak values of the spatial frequency curve in 20 lines/mm respectively position at distances from the paraxial focal point with the d-line (587.56 mm). The distances are as the following:

f6.43; −0.242 mm f10; −0.111 mm

The lens data and the aspherical coefficients of the taking lens of the fourth embodiment are shown in the following Tables 7 and 8.

TABLE 7

| i | R | D | Radius of clear aperture | Height of the axial bundle | N | Dispersion |
|---|---|---|---|---|---|---|
| 1 | 4.286 | 1.70 | 2.5 | 2.06 | 1.492 | 57.5 |
| 2 | 4.100* | 0.82 | | | | |
| Flare stop | ∞ | 0.17 | 1.80 | 1.80 | | |
| Smaller stop | ∞ | 0.41 | | | | |
| 3 | ∞ | 0.79 | | | 1.492 | 57.5 |
| 4 | −20.511* | 0.15 | 1.78 | 1.78 | | |
| Stop aperture | ∞ | 28.316 | 1.77 | 1.77 | | |
| Image surface | −149.330 | −0.392 | | | | |

TABLE 8

| | i = 2 | i = 4 |
|---|---|---|
| K | −0.66147 | 0.000000 |
| A | 0.208782E−02 | −0.574671E−03 |
| B | 0.174335E−03 | −0.150350E−04 |
| C | 0.000000E+00 | 0.000000E+00 |
| D | 0.000000E+00 | 0.000000E+00 |

According to the fourth embodiment, the characteristic values of the present invention "F/F1" and "F/R3×f1" are:

$F/F1=33.14/104.37≈0.32$ $F/R3×f1=33.14/0×8.0=0$

Therefore, the fourth embodiment satisfies conditions (1) and (2).

As shown in Table 7, the characteristic values of "E1/H1" and "E2/H2" are:

$E1/H1=1.80/1.80=1.0$ $E2/H2=1.78/1.78=1.0$

Therefore, the fourth embodiment satisfies the conditions (3) and (4).

Aberration curves of the taking lens 10 of the fourth embodiment are shown in FIGS. 11 and 12A to 12C respectively.

Embodiment 5

In the above embodiments, it is described examples in which the flare stop 13 and the stop aperture 15 are provided respectively between the first and second lenses and on the image side surface of the second lens. However, the height of the off-axial light rays becomes lower than the height of the axial light bundle between the image side surfaces of the first and second lenses in the taking lens of the present invention, so the lens properties and the illuminance of the image surface are not defected. Thus, even when the positions of the flare stop and the stop aperture are exchanged, a good image can be formed in the entire image surface.

Then, by applying the taking lens 10 of the fourth embodiment shown in FIG. 10, is constituted the taking lens in which the positions of the flare stop 13 and the stop aperture 15 are swapped over, whereas the radius E2 of the clear aperture on the image side surface 12b of the second lens 12 is 1.85 mm.

Figure 13:
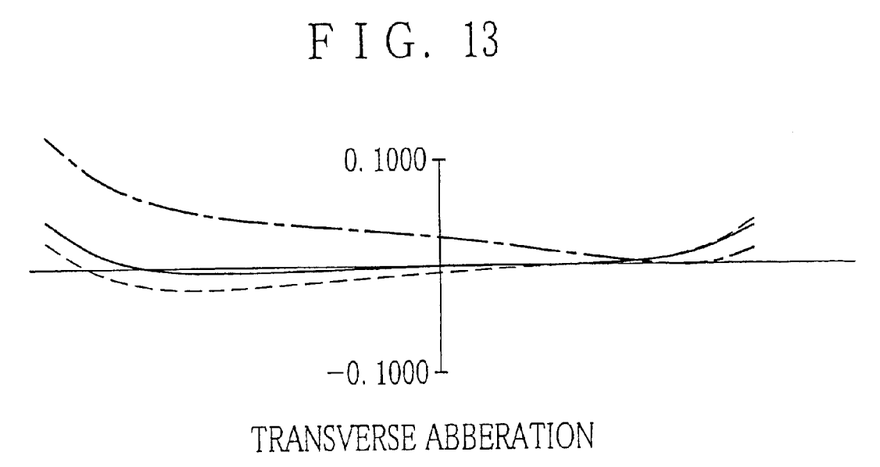
FIG. 13 is a diagram showing a transverse aberration of the taking lens according to Embodiment 5 of the present invention.

The transverse aberration curve of the taking lens of the fifth embodiment is shown in FIG. 13.

Thus, the present invention is not limited to the above embodiments that have been described with reference to the drawings. However, various changes and modifications will be apparent to those having skill in this field. Therefore, unless otherwise these changes and modifications depart from the scope of the present invention that are attached hereto, they should be construed as included therein.

What is claimed is:

1. A taking lens comprising a first meniscus lens having a convex surface facing an object side and a second lens having a positive power, wherein an image side surface of said first lens and either surface of said second lens are aspherical, and wherein said taking lens satisfies the following condition:

$0.25≤F/F1≤0.39$ $-2.5≤F/R3×fno≤1.5$ wherein F represents a focal length of said taking lens, F1 represents a focal length of said first lens, R3 represents a radius of the curvature of an object side surface of said second lens, and fno represents an f-number of said taking lens at open aperture.

2. A taking lens as defined in claim 1 further comprising a stop disposed at an image side surface of said second lens and a flare stop that restricts light paths of off-axial rays disposed between said first and second lenses, wherein said first lens further satisfies the following condition:

$1.0≤E1/H1≤1.3$ wherein E1 represents a radius of a clear aperture of said flare stop, and H1 represents a height of an axial bundle from the optical axis at said flare stop.

3. A taking lens as defined in claim 2 further comprising a smaller stop disposed between said first and second lenses.

4. A taking lens as defined in claim 1 further comprising a stop disposed between said first and second lenses, wherein said taking lens satisfies the following condition:

$1.0≤E2/H2≤1.3$ wherein E2 represents a radius of a clear aperture on an image side surface of said second lens and H2 represents a height of an axial bundle from the optical axis on said second lens surface.

5. A taking lens comprising:

a first lens disposed on an object side, and said first lens being a meniscus lens having a convex surface on an object side and an aspherical surface on an image side;

a second lens disposed behind said first lens, and said second lens having a positive power and an aspherical surface on an image side;

a flare stop disposed between said first and second lenses;

a stop disposed at an image side surface of said second lens;

wherein radiuses of clear apertures of said flare stop and said aspherical surface of said second lens are equal to a height of an axial bundle from the optical axis; and wherein said taking lens satisfies the following condition:

$$0.25 \leq F/F1 \leq 0.39$$

$$-2.5 \leq F/R3 \times fno \leq 1.5$$

wherein F represents a focal length of said taking lens, F1 represents a focal length of said first lens, R3 represents a radius of the curvature of an object side surface of said second lens, and fno represents an f-number of said taking lens at open aperture.

6. A taking lens as defined in claim 5 further satisfying the following condition:

$$1.0 \leq E1/H1 \leq 1.3$$

wherein E1 represents a radius of a clear aperture of said flare stop, and H1 represents a height of an axial bundle from the optical axis at said flare stop.

7. A taking lens as defined in claim 6 further satisfying the following condition:

$$1.0 \leq E2/H2 \leq 1.3$$

wherein E2 represents a radius of a clear aperture on an image side surface of said second lens and H2 represents a height of an axial bundle from the optical axis on said second lens surface.

8. A taking lens as defined in claim 7, wherein a radius of a clear aperture of said flare stop is 2.25 mm.

9. A taking lens as defined in claim 7, wherein a radius of a clear aperture of an image side surface of said second lens is 2.26 mm.

10. A taking lens comprising:

a first lens disposed on an object side, and said first lens being a meniscus lens having a convex surface on an object side and an aspherical surface on an image side;

a second lens disposed behind said first lens, and said second lens having a positive power and an aspherical surface on an image side;

a stop disposed between said first and second lenses;

a flare stop disposed at an image side surface of said second lens;

wherein radiuses of clear apertures of said flare stop and said aspherical surface of said second lens are equal to a height of an axial bundle from the optical axis; and wherein said taking lens satisfies the following condition:

$$0.25 \leq F/F1 \leq 0.39$$

$$-2.5 \leq F/R3 \times fno \leq 1.5$$

wherein F represents a focal length of said taking lens, F1 represents a focal length of said first lens, R3 represents a radius of the curvature of an object side surface of said second lens, and fno represents an f-number of said taking lens at open aperture.

* * * * *